(12) United States Patent
Jeong (10) Patent No.: US 11,845,434 B2
(45) Date of Patent: Dec. 19, 2023

(54) REGENERATIVE BRAKING CONTROL METHOD OF VEHICLE

(71) Applicants: Hyundai Motor Company, Seoul (KR); Kia Motors Corporation, Seoul (KR)

(72) Inventor: Jong Kyu Jeong, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 65 days.

(21) Appl. No.: 16/431,526

(22) Filed: Jun. 4, 2019

(65) Prior Publication Data

US 2020/0130694 A1  Apr. 30, 2020

(30) Foreign Application Priority Data

Oct. 24, 2018 (KR) .................. 10-2018-0127189

(51) Int. Cl.
 *B60W 30/18* (2012.01)
 *B60W 30/045* (2012.01)
 (Continued)

(52) U.S. Cl.
 CPC ......... *B60W 30/18127* (2013.01); *B60L 7/10* (2013.01); *B60T 8/1761* (2013.01); *B60T 8/326* (2013.01); *B60W 30/045* (2013.01); *B60W 30/18172* (2013.01); *B60K 6/22* (2013.01); *B60T 2210/10* (2013.01); *B60T 2220/04* (2013.01); *B60T 2240/02* (2013.01); *B60T 2270/10* (2013.01); *B60T 2270/20* (2013.01); *B60T 2270/30* (2013.01); *B60T 2270/602* (2013.01); *B60T 2270/603* (2013.01); *B60T 2270/613* (2013.01); *B60W 2420/42* (2013.01); *B60W 2520/26* (2013.01); *B60W 2520/28* (2013.01); *B60W 2540/10* (2013.01);
 (Continued)

(58) Field of Classification Search
 CPC .................. B60W 30/18127; B60W 30/18172
 See application file for complete search history.

(56) References Cited

U.S. PATENT DOCUMENTS

| 6,709,075 | B1 * | 3/2004 | Crombez | ............ B60L 15/2009 |
| | | | | 303/3 |
| 2004/0210356 | A1 * | 10/2004 | Wilton | .................... B60L 58/14 |
| | | | | 701/22 |

(Continued)

FOREIGN PATENT DOCUMENTS

| JP | 2000270409 A | 9/2000 |
| JP | 2015535204 A | 12/2015 |
| KR | 1020140037388 A | 3/2014 |

*Primary Examiner* — Imran K Mustafa
(74) *Attorney, Agent, or Firm* — MORGAN, LEWIS & BOCKIUS LLP (57) ABSTRACT

A regenerative braking control method of a vehicle, may include a first operation of determining a driving risk of a road surface on the basis of a status of the road surface while driving; a second operation of determining whether an accelerator pedal is released while driving; a third operation of determining whether a brake pedal is operated while driving; and a fourth operation of performing no regenerative braking when the accelerator pedal is determined as being released, the driving risk of the road surface is determined as being high, and when the brake pedal is determined as not being operated.

16 Claims, 3 Drawing Sheets

(51) Int. Cl.
  *B60T 8/32*       (2006.01)
  *B60T 8/1761*     (2006.01)
  *B60L 7/10*       (2006.01)
  *B60K 6/22*       (2007.10)

(52) U.S. Cl.
  CPC ..... *B60W 2540/12* (2013.01); *B60W 2552/00* (2020.02); *B60W 2555/20* (2020.02); *B60Y 2200/91* (2013.01); *B60Y 2200/92* (2013.01); *B60Y 2300/022* (2013.01); *B60Y 2300/18125* (2013.01)

(56) References Cited

U.S. PATENT DOCUMENTS

| | | | | |
|---|---|---|---|---|
| 2008/0129541 A1* | 6/2008 | Lu | ............... | G06V 20/56 340/905 |
| 2013/0162009 A1* | 6/2013 | Mitts | ............... | B60L 7/26 303/3 |
| 2013/0289809 A1* | 10/2013 | Treharne | ............... | B60L 3/0046 180/65.285 |
| 2015/0191159 A1* | 7/2015 | Akamine | ............... | B60T 7/042 701/22 |
| 2017/0320389 A1* | 11/2017 | Burt | ............... | B60K 28/165 |
| 2018/0162399 A1* | 6/2018 | Prakah-Asante | ... | B60W 50/085 |
| 2020/0079381 A1* | 3/2020 | Lombrozo | ............... | B62D 6/003 |

\* cited by examiner

REGENERATIVE BRAKING CONTROL METHOD OF VEHICLE

CROSS-REFERENCE TO RELATED APPLICATION

The present application claims priority to Korean Patent Application No. 10-2018-0127189 filed on Oct. 24, 2018, the entire contents of which is incorporated herein for all purposes by this reference.

BACKGROUND OF THE INVENTION

Field of the Invention

The present invention relates to a regenerative braking control method of a vehicle. More particularly, it relates to a regenerative braking control method of a vehicle, which is capable of securing driving stability of a vehicle performing regenerative braking.

Description of Related Art

Generally, a vehicle using a motor as a driving source may perform regenerative braking to charge electricity by generating a counter electromotive force at the motor in an OFF condition of an accelerator pedal or an ON condition of a brake pedal while driving. When the accelerator pedal is released while driving, the vehicle charges electricity through regenerative braking while minimizing a different feeling of a driver. When the brake pedal is operated while driving, the vehicle raises a hydraulic braking pressure to a predetermined level and then performs regenerative braking to generate deceleration corresponding to an intent of the driver.

Conventionally, to maximize a fuel efficiency improvement effect of a vehicle, regenerative braking is performed without feedback on a road surface and a driving condition. However, when regenerative braking is performed on a road surface in a specific condition such as a low friction road, there may occur a problem in that a vehicle behavior becomes unstable and thus driving stability is degraded.

Figure 3:
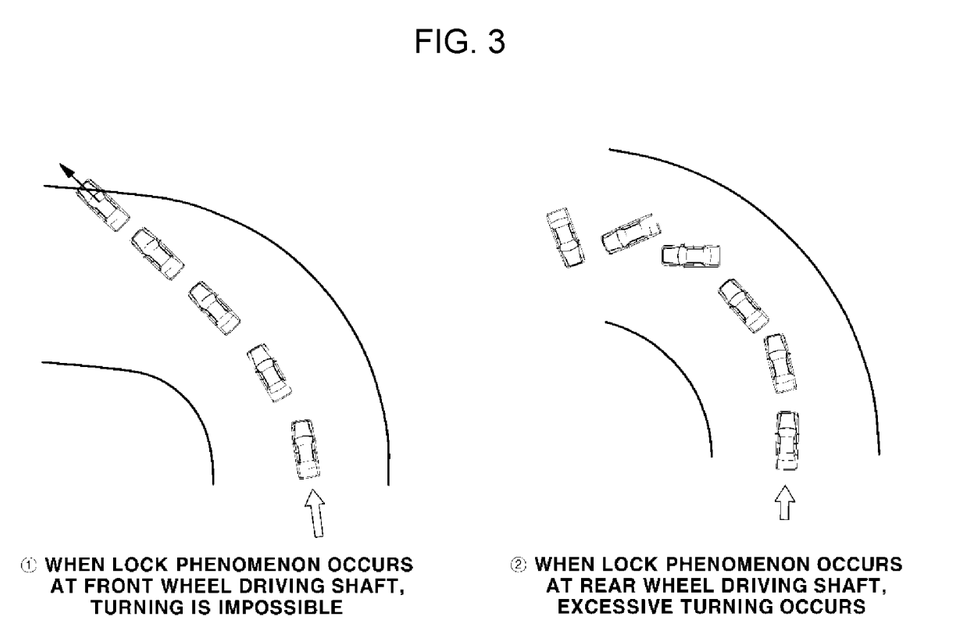
FIG. 3 is a diagram illustrating a conventional problem in that driving stability is degraded when regenerative braking is performed on an icy road surface.

For example, in the case of an icy road surface, when regenerative braking is performed by a vehicle even though a driver intends to slow down by releasing an accelerator pedal, a friction coefficient of an icy road surface becomes extremely low and thus a lock phenomenon temporarily occurs at a driveshaft of the vehicle such that a vehicle behavior is exhibited different from an intent of the driver. As shown in FIG. 3, when a lock phenomenon occurs at a front wheel driveshaft, a turning by steering of the driver is impossible such that an understeer phenomenon occurs, whereas when the lock phenomenon occurs at a rear wheel driveshaft, a rear wheel is easily spun by fine steering such that an oversteer phenomenon occurs.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a regenerative braking control method of a vehicle, which is capable of primarily securing driving stability and, simultaneously, achieving improvement of fuel efficiency by controlling regenerative braking in consideration of a predicted status of a road surface.

Various aspects of the present invention are directed to providing a regenerative braking control method of a vehicle, the regenerative braking control method including a first operation of determining a driving risk of a road surface on the basis of a status of the road surface while driving, a second operation of determining whether an accelerator pedal is released while driving, a third operation of determining whether a brake pedal is operated while driving, and when the accelerator pedal is determined as being released, the driving risk of the road surface is determined as being high, and when the brake pedal is determined as not being operated, a fourth operation of performing no regenerative braking.

The first operation may include a color detecting operation of determining a driving risk of the vehicle driving on the road surface on the basis of a measured value of a vision sensor of the vehicle which detects a color of the road surface. When the color of the road surface is determined as being white series on the basis of the measured value of the vision sensor, the color detecting operation may include determining a driving risk of the road surface as being high, and when the color of the road surface is determined as being black series on the basis of the measured value of the vision sensor, the color detecting operation may include determining a driving risk of the road surface as not being high.

The first operation may include a rain detecting operation of determining a driving risk of the vehicle driving on the road surface on the basis of a measured value of a rain sensor of the vehicle which detects rainwater. When the measured value of the rain sensor is equal to or greater than a reference value for determining the road surface as being wet, the rain detecting operation may include determining a driving risk of the road surface as being high, and when the measured value of the rain sensor is less than the reference value, the rain detecting operation may include determining the driving risk of the road surface as not being high.

When the driving risk of the road surface is determined as being high in at least one of the rain detection operation and the color detecting operation, the first operation may include determining the driving risk of the road surface as being high.

The first operation may further include, when a difference in wheel speed between a front left wheel speed and a front right wheel speed occurs after the rain detecting operation, determining the road surface as being in a ponding state, and when the road surface is determined as being in the ponding state and then the accelerator pedal is determined as being released within a predetermined time for which the vehicle is determining as driving on the road surface which is in the ponding state, re-determining the driving risk of the road surface as being high.

The first operation may further include after the color detecting operation, determining the number of operation times of a traction control system (TCS) for preventing wheel slip and an operating time of the TCS after a starting of the vehicle is turned on, and when the number of operation times of the TCS is equal to or greater than a number of predetermined times for which an occurrence rate of the wheel slip is determined as being high and the operating time of the TCS is equal to or greater than a predetermined time for which the occurrence rate of the wheel slip is determined as being high, re-determining the driving risk of the road surface as being high.

The first operation may further include, when an external air temperature of the vehicle is less than a reference temperature which is set to a temperature at which icing occurs on the road surface, determining that the driving risk of the road surface is determined by the color detecting operation, and when the external air temperature of the vehicle is equal to or higher than the reference temperature, determining that the driving risk of the road surface is determined as being high by the rain detecting operation.

The regenerative braking control method of a vehicle may further include the following operations. The regenerative braking control method may further include, when the driving risk of the road surface is determined as not being high in the first operation, the accelerator pedal is determined as being released, and when the brake pedal is determined as not being operated, a fifth operation of generating a braking force of the vehicle by performing only the regenerative braking among hydraulic braking and the regenerative braking. The regenerative braking control method may further include, when the driving risk of the road surface is determined as not being high in the first operation, the accelerator pedal is determined as being released, and when the brake pedal is determined as being operated, a sixth operation of generating a braking force of the vehicle by performing the regenerative braking and hydraulic braking. The regenerative braking control method may further include, when the driving risk of the road surface is determined as being high in the first operation, the accelerator pedal is determined as being released, and when the brake pedal is determined as being operated, a seventh operation of generating a braking force of the vehicle by performing the regenerative braking and hydraulic braking.

The regenerative braking control method may further include, after the fourth operation, an eighth operation of determining whether an execution condition of electronic stability control (ESC) for steering a driving direction of the vehicle is satisfied, and when the execution condition of the ESC is determined as being satisfied, a ninth operation of executing the ESC, and when the execution condition of the ESC is determined as not being satisfied, a tenth operation of allowing the vehicle to drive in an inertial driving mode in which the accelerator pedal is released.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described to allow those skilled in the art to easily practice the present invention.

Figure 1:
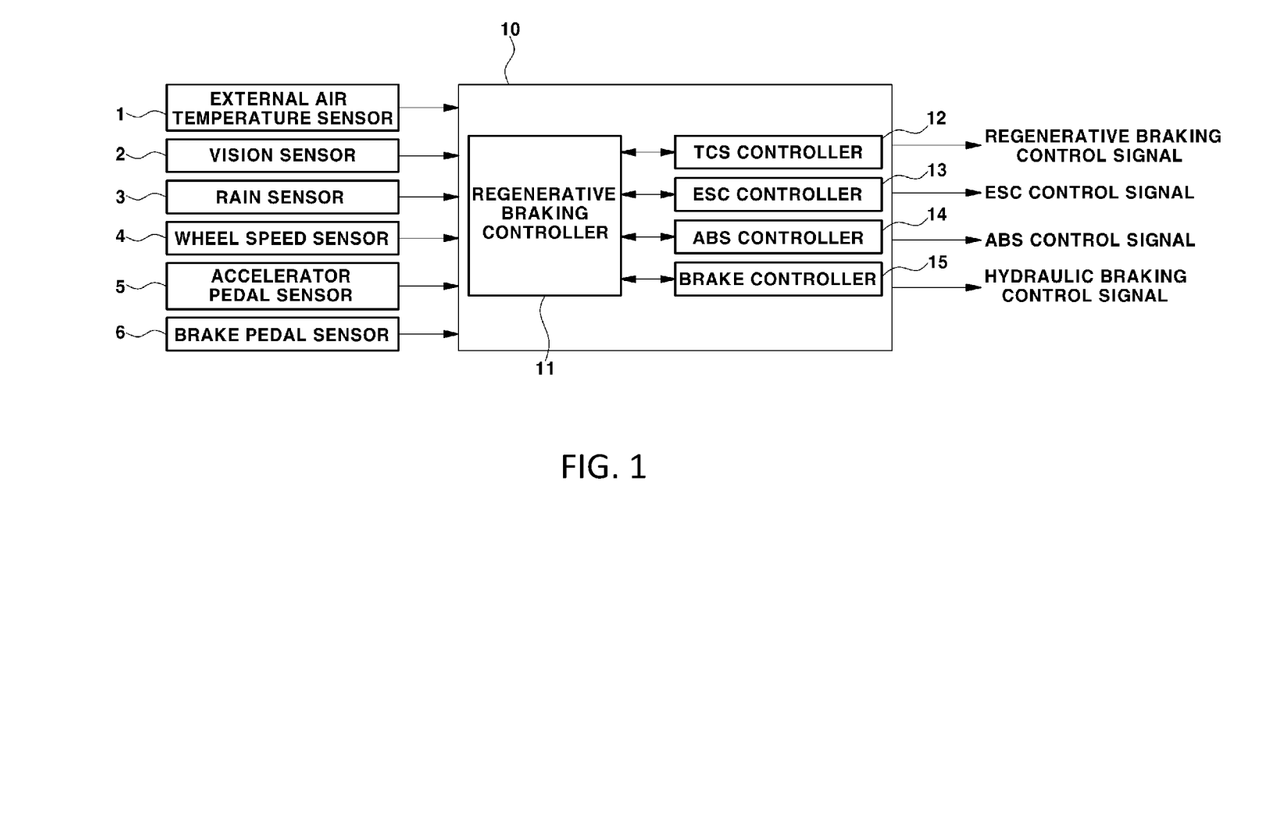
FIG. 1 is a block diagram illustrating a configuration of an in-vehicle device capable of performing a regenerative braking control method of a vehicle according to an exemplary embodiment of the present invention.

FIG. 1 illustrates a configuration of an in-vehicle device used for performing a control process of the present invention. As shown in the drawing, the in-vehicle device configured for performing the control process of the present invention includes an external air temperature sensor 1, a rain sensor 3, a vision sensor 2, a wheel speed sensor 4, an accelerator pedal sensor 5, and a brake pedal sensor 6, which are disposed at a vehicle, and includes a controller 12 of a traction control system (TCS) (hereinafter referred to as a "TCS controller 12"), a controller 13 of an electronic stability control system (ESC) (hereinafter referred to as an "ESC controller 13"), a controller 14 of an anti-lock brake system (ABS) (hereinafter referred to as an "ABS controller 14", a brake controller 15, and a controller 11 for controlling regenerative braking (hereinafter referred to as a "regenerative braking controller 11").

The external air temperature sensor 1 is a sensor disposed at a vehicle to detect an external air temperature of the vehicle, and the rain sensor 3 is a sensor disposed at the vehicle to detect strength and an amount of rainwater. The vision sensor 2 is a sensor disposed at the vehicle to detect information on a road surface color and the like ahead of the vehicle, and the wheel speed sensor 4 is a sensor disposed at each of wheels to detect a wheel speed of each thereof.

The accelerator pedal sensor 5 is a sensor for detecting a position of an accelerator pedal when a driver manipulates the accelerator pedal, and an operation and release of the accelerator pedal may be detected on the basis of a signal of the accelerator pedal sensor 5. The brake pedal sensor 6 is a sensor for detecting a position of a brake pedal when the driver manipulates the brake pedal, and an operation and release (nonoperaion) of the brake pedal may be detected on the basis of a signal of the brake pedal sensor 6.

The TCS controller 12 is a controller for controlling an overall operation of a TCS disposed at the vehicle, and when a TCS operation condition is satisfied, the TCS controller 12 may perform TCS control to operate the TCS. The TCS is a system for preventing wheel slip by controlling an engine and a brake when the vehicle is unintentionally or rapidly accelerated, and the TCS may be used as an electronic control system for improving driving stability of the vehicle. Upon unintentional or intentional acceleration of the vehicle on a low friction road surface or an asymmetric road surface, the TCS may prevent excessive slip of a driving wheel to block spin of the vehicle and improve departure performance and acceleration performance and steering stability of the vehicle. When the vehicle starts or is accelerated on a slippery road surface and thus an excessive driving force is generated to cause a wheel slip phenomenon and the like, the TCS may control a rotation speed of the driving wheel by controlling a driving force of the vehicle, maximizing acceleration of the vehicle.

The ESC controller 13 is a controller for controlling an overall operation of an ESC disposed at the vehicle, and when an ESC operation condition is satisfied, the ESC controller 13 may perform ESC to operate the ESC. The ESC is a system for optimally controlling a driving attitude of the vehicle and may be used as an electronic control system for improving driving stability by stably maintaining an attitude of the vehicle while driving. The ESC is feedback control of a vehicle behavior on the basis of signals detected through a yaw rate sensor, a steering angle sensor, a wheel speed sensor, and the like which are disposed at the vehicle. As a vehicle speed is faster, a condition for executing the ESC becomes sensitive, and as the vehicle speed is slower, the condition therefore becomes insensitive. When a driving direction of the vehicle, which will travel, is different from an actual driving direction, the ESC may determine a status of a steering wheel (a steering angle and the like) to control the driving direction of the vehicle through the ESC.

The ABS controller 14 is a controller for controlling an overall operation of an ABS disposed at the vehicle, and when an ABS operation condition is satisfied, the ABS controller 14 may perform ABS control to operate the ABS. The ABS is a system for preventing wheel slip by blocking a lock of a brake when braking and the ABS may be used as an electronic control system for improving driving stability of the vehicle. The ABS may prevent a lock phenomenon of a wheel when the brake is stepped on while driving, maintaining a steering force of the vehicle.

The brake controller 15 is a controller for controlling an overall operation of a brake device disposed at the vehicle, and the brake controller 15 may control hydraulic braking according to an amount of depression (operation amount) of the brake pedal and may control braking deceleration through cooperative control with the regenerative braking controller 11.

The regenerative braking controller 11 is a controller provided at the vehicle and involved in control of regenerative braking, and the regenerative braking controller 11 is configured as a main controller for performing regenerative braking control of the present invention. The regenerative braking controller 11 may perform the regenerative braking control of the present invention through cooperative control with the above-described controllers. The regenerative braking controller 11 may perform the regenerative braking control of the present invention through cooperative control with the ESC controller 13, the ABS controller 14, and the TCS controller 12 which are provided at the vehicle.

When an executable condition of regenerative braking is satisfied while driving, the regenerative braking controller 11 determines whether to execute the regenerative braking on the basis of a status of a road surface and a braking intent of a driver to control the regenerative braking, primarily securing driving stability of the vehicle. That is, in a condition in which the driving stability is secured, the regenerative braking controller 11 maximally executes the regenerative braking to achieve improvement of fuel efficiency, and in a condition in which the driving stability should be more secured, the regenerative braking controller 11 optimally controls the regenerative braking to primarily secure the driving stability and, simultaneously, improve the fuel efficiency by the regenerative braking.

The control process of the present invention may be performed through the cooperative control of the above-described controllers 11, 12, 13, 14, and 15, but the control process may be performed by a single integrated controller. A control unit 10 indicated by a reference numeral 10 in FIG. 1 collectively refers to in-vehicle controllers for performing the regenerative braking control of the present invention. The control unit 10 may collectively refer to the regenerative braking controller 11, the TCS controller 12, the ESC controller 13, the ABS controller 14, and the brake controller 15 or may refer to a single integrated controller configured to perform the functions of the above-described controllers 11, 12, 13, 14, and 15. The functions performed by the regenerative braking controller 11, the TCS controller 12, the ESC controller 13, the ABS controller 14, and the brake controller 15 may be performed by the control unit 10.

A control process of the present invention, which is performed by the above-described in-vehicle device and the control unit 10 included in the in-vehicle device, will be described below.

To primarily secure driving stability of a vehicle, when a driving risk of a road surface on which the vehicle is driving is determined as being high and a brake pedal is determined as not being operated, the control unit 10 does not execute the regenerative braking even though the accelerator pedal is released. To the present end, the control unit 10 first determines the driving risk of the vehicle, which is driving on the road surface, based on a status of the road surface on which the vehicle is driving and then determines whether the accelerator pedal is released and the brake pedal is operated. Such a determination process may be performed by the regenerative braking controller 11.

Conventionally, when the accelerator pedal is released, the regenerative braking is generally performed. However, since deceleration of the vehicle is generated irrespective of a braking intent of a driver when an operation of the brake pedal is not detected, when the driving risk of the road surface is determined as being high in a driving state in which a vehicle speed is reduced irrespective of the braking intent of the driver (i.e., in a state in which the brake pedal is released and the accelerator pedal is released), the control unit 10 does not perform the regenerative braking, securing driving stability of the vehicle which is driving on the road surface. In other words, when the braking intent of the driver is determined as being absent, the control unit 10 does not generate a control signal for performing the regenerative braking even though the accelerator pedal is released.

To determine the driving risk of the road surface, the regenerative braking controller 11 may use a signal of the rain sensor 3, a signal of the vision sensor 2, and a signal of the external air temperature sensor 1.

The driving risk of the road surface may be determined on the basis of the signal of the vision sensor 2, and when a color of the road surface is determined as white series from the signal of the vision sensor 2, the regenerative braking controller 11 may determine the driving risk of the road surface as being high, and when the color of the road surface is determined as black series (a basic color of the road surface), the regenerative braking controller 11 may determine the driving risk of the road surface as being low. For example, in the case of a snowy or icy road, the color of the road surface is detected as white series so that the regenerative braking controller 11 may determine a behavior of the vehicle driving on the road surface as being unstable. In the instant case, when a ratio of white series is higher on the basis of a ratio of a white color to a black color, the color of the road surface may be determined as being white series. Alternatively, a radar sensor configured for detecting ice or snow on a road surface may be used instead of the vision sensor 2, or a combination of the vision sensor 2 and the radar sensor may be used.

The driving risk of the road surface may be determined on the basis of the signal of the rain sensor 3, and when a measured rainwater value determined from the signal of the rain sensor 3 is equal to or greater than a predetermined rainwater reference value, the regenerative braking controller 11 determines the driving risk of the road surface as being high, and when the measured rainwater value is less than the predetermined rainwater reference value, the regenerative braking controller 11 determines the driving risk of the road surface as being low. The predetermined rain reference value may be an amount and/or a strength value of rainwater which is set to distinguish a wet road surface by rainwater from a dried road surface. Therefore, when the measured rainwater value is equal to or greater than the predetermined rainwater reference value, the road surface may be determined as being in a wet state, and when the measured rainwater value is less than the predetermined rainwater reference value, the road surface may be determined as being in a dried state. In the case of a wet road surface, a friction coefficient for a wheel is usually lowered such that the behavior of the vehicle becomes unstable.

When any one of the signal of the vision sensor 2 and the signal of the rain sensor 3 becomes grounds for determining the driving risk of the road surface as being high, the regenerative braking controller 11 determines the driving risk of the road surface as being high. For example, even though the color of the road surface is determined as being black series on the basis of the signal of the vision sensor 2, when the road surface is determined as a wet road surface on the basis of the signal of the rain sensor 3, the regenerative braking controller 11 may determine the driving risk of the road surface as being high.

Furthermore, the regenerative braking controller 11 may determine more accurately the driving risk of the road surface using the signal of the external air temperature sensor 1. When an external air temperature drops in winter season, snow covering a road surface is frozen and thus a driving risk of a vehicle driving on the road surface becomes higher. For example, in a condition in which an external air temperature is low during winter season, when a color of a road surface is white series, the regenerative braking controller 11 may predict more accurately a status in which the road surface is covered with snow or the snow covering the road surface is frozen to form an icy road surface. Therefore, when the external air temperature of the vehicle is less than a predetermined reference temperature and the color of the road surface is white series, the regenerative braking controller 11 may determine more accurately a status of the driving risk of the road surface as being high. In the instant case, the predetermined reference temperature may be set to a temperature value at which snow covering a road surface is frozen.

Furthermore, when the color of the road surface is determined as being white series using the vision sensor 2, the regenerative braking controller 11 may re-determine to verify the driving risk of the vehicle driving on the road surface on the basis of the number of operation times and an operating time of the TCS which are monitored after a starting of the vehicle is turned on. After the starting of the vehicle is turned on, when the number of operation times of the TCS by TCS control is equal to or greater than a predetermined number of predetermined times and an operating time of the TCS by the TCS control (an accumulated operating time after the starting of the vehicle is turned on) is equal to or greater than a predetermined time, the regenerative braking controller 11 may re-determine the driving risk of the road surface as being high. In the present time, the number of operation times and the operating time of the TCS may be monitored through the TCS controller 12. Here, the predetermined number of predetermined times may be set to a value of the number of times an occurrence rate of wheel slip is determined as being high, and when the wheel slip occurs frequently after the starting of the vehicle is turned on, the regenerative braking controller 11 may determine a driving risk of a corresponding road surface as being high. Furthermore, the predetermined time may be set to a time value at which the occurrence rate of the wheel slip is determined as being high. When a cumulative time for which the wheel slip occurs after the starting of the vehicle increases, the regenerative braking controller 11 may determine a driving risk of a corresponding road surface as being high. For example, when the number of operation times of the TCS is 3 times or more and a cumulative operating time of the TCS is 1.5 seconds or more, the regenerative braking controller 11 may determine the vehicle as driving on a slippery road surface where an occurrence rate of wheel slip is high.

Furthermore, when rain is determined, using the rain sensor 3, as falling on a road surface with an amount which is equal to or greater than the predetermined rainwater reference value, the regenerative braking controller 11 may determine whether standing water exist on the road surface and may re-determine to verify the driving risk of the road surface on the basis of the determination result. The regenerative braking controller 11 compares a wheel speed of a front left wheel with a wheel speed of a front right wheel, and when a difference between the wheel speed of the front left wheel and the wheel speed of the front right wheel is equal to or greater than a reference speed, the regenerative braking controller 11 determines the road surface as being in a ponding state (a state in which standing water exist on the road surface). The regenerative braking controller 11 determines the vehicle as driving on the road surface which is in the ponding state, and then when the accelerator pedal is released within the predetermined time (e.g., 3 seconds), the regenerative braking controller 11 may re-determine the driving risk of the vehicle driving on the road surface as being high. Here, the predetermined time is set to a time for which the accelerator pedal is determined as being released while the vehicle is driving on the road surface which is in the ponding state. When the vehicle is driving on a low friction road surface such as a road surface in a ponding state, there is a difference in wheel speed between left and right wheels.

When the driving risk of the road surface is determined as being high on the basis of the above-described conditions, the regenerative braking controller 11 may determine that a behavior of the vehicle driving on the road surface becomes unstable and driving stability of the vehicle is degraded. Therefore, when the accelerator pedal is released while driving, before generating a control signal for performing regenerative braking, the regenerative braking controller 11 determines whether an operation of the brake pedal is detected to determine a braking intent of the driver. When an operation signal of the brake pedal is not detected, i.e., when the brake pedal is not operated, the regenerative braking controller 11 does not generate the control signal for performing the regenerative braking. This is because, when the regenerative braking is performed without the braking intent of the driver on the road surface with a high driving risk, a problem in that a turning according to steering of the driver is impossible or a rear wheel which lost a friction force is easily spun by fine steering may occur (see FIG. 3). Therefore, when the brake pedal is not operated even though the accelerator pedal is released on a road surface with a high driving risk, the regenerative braking controller 11 does not perform the regenerative braking.

As described above, when the regenerative braking is not performed, to secure behavior stability of the vehicle on the road surface with a high driving risk, the control unit 10 determines whether a condition for executing the ESC (i.e., an execution condition of the ESC) is satisfied through the ESC controller 13. When the execution condition of the ESC is determined as being satisfied through the ESC controller 13, the control unit 10 generates a signal for controlling an operation of the ESC, and when the execution condition of the ESC is determined as not being satisfied, the control unit 10 allows the vehicle to drive in an inertial driving mode. In the inertial driving mode, the vehicle is driving slowly due to the inertia in a state in which the accelerator pedal is released. When the execution condition of the ESC is not satisfied and the vehicle is driving in the inertial driving mode, problems which will be caused by a manipulation of a steering wheel and a rapid pull phenomenon of the vehicle may be minimized.

When values equal to or greater than predetermined reference values for lateral acceleration and a yaw rate of the vehicle are measured, the execution condition of the ESC may be determined as being satisfied. In other words, when a measured lateral acceleration value of the vehicle detected in real time is equal to or greater than a predetermined lateral acceleration reference value and a measured yaw rate value of the vehicle detected in real time is equal to or greater than a predetermined yaw rate reference value, the execution condition of the ESC may be determined as being satisfied.

Meanwhile, when the accelerator pedal is released and the brake pedal is operated while the vehicle is driving on a road surface of which a driving risk is determined as being high, the regenerative braking controller 11 generates the control signal for performing the regenerative braking. When the control signal for performing the regenerative braking is generated, a control signal for performing hydraulic braking is also generated. That is, when release of the accelerator pedal is detected and an operation of the brake pedal is detected while the vehicle is driving on the road surface with a high driving risk, both of the control signal for performing the hydraulic braking and the control signal for performing the regenerative braking are generated. The control signal for performing the hydraulic braking may be generated by the brake controller 15. Furthermore, when the hydraulic braking and the regenerative braking are simultaneously performed, a certain level of a braking force is generated by the hydraulic braking and then a braking force is generated by the regenerative braking, and braking deceleration of the vehicle according to a braking intent of the driver is generated by the hydraulic braking and the regenerative braking.

For example, the control signal for performing the regenerative braking may be a signal for controlling an operation of a clutch disposed between a motor and a wheel of the vehicle. The motor may be a driving motor configured for generating a driving force of the vehicle or a hybrid start generator (HSG) for activating an engine, and deceleration of the vehicle by the regenerative braking is determined according to an amount of a counter electromotive force generated by the motor. Furthermore, the control signal for performing the hydraulic braking may be a signal for controlling an amount of a hydraulic braking pressure in a master cylinder of the vehicle.

When the ESC controller 13 and the ABS controller 14 recognize that braking deceleration according to an intent of the driver is being generated by the hydraulic braking and the regenerative braking, the ESC controller 13 and the ABS controller 14 determine whether a condition for executing the ESC (i.e., a first condition for operating the ESC) and a condition for executing the ABS control (i.e., a second condition for operating the ABS) are satisfied. When any one of the first condition and the second condition is satisfied, the ESC controller 13 and the ABS controller 14 request the regenerative braking controller 11 to immediately terminate the regenerative braking, and control corresponding to the satisfied one of the first condition and the second condition is primarily executed for the regenerative braking.

Meanwhile, when the driving risk of the road surface is determines as not being high, i.e., the driving risk of the road surface is determined as being low, the regenerative braking controller 11 controls the regenerative braking according to whether the accelerator pedal and the brake pedal are operated. When the driving risk of the road surface on which the vehicle is driving is determined as being low, the accelerator pedal is released, and the brake pedal is operated, the regenerative braking controller 11 generates a control signal for performing the regenerative braking (hereinafter, referred to as a "regenerative braking control signal"). Furthermore, when the regenerative braking control signal is generated, a control signal for performing hydraulic braking (hereinafter, referred to as a "hydraulic braking control signal") is also generated. Thereafter, as described above, the ESC controller 13 and the ABS controller 14 determine whether the condition for executing the ESC (the first condition) and the condition for executing the ABS control (the second condition) are satisfied.

Furthermore, when the driving risk of the road surface on which the vehicle is driving is determined as not being high or as being low, the accelerator pedal is released, and the brake pedal is not operated, the regenerative braking controller 11 generates the regenerative braking control signal. At the present point, the hydraulic braking control signal is not generated, and only the regenerative braking control signal is generated. Therefore, only the regenerative braking is performed of the hydraulic braking and the regenerative braking. When the regenerative braking is performed by the regenerative braking control signal, the regenerative braking may be performed according to each of stages of coast regeneration. When a plurality of different regenerative braking amounts is set in the regenerative braking controller 11 according to the stages of the coasting regeneration, control of the regenerative braking may be performed to generate a regenerative braking amount according to a stage of the coasting regeneration determined by the driver.

When the brake pedal is not operated, it is impossible to execute the ABS control. Therefore, while the regenerative braking is performed, only whether the condition for executing the ESC is satisfied is determined. For example, when a signal indicating that regenerative braking is being performed is received from the regenerative braking controller 11, the ESC controller 13 starts to determine whether the execution condition of the ESC is satisfied. When the execution condition of the ESC is satisfied, the ESC controller 13 immediately requests the regenerative braking controller 11 to terminate the regenerative braking and primarily executes the ESC.

As described above, according to an exemplary embodiment of the present invention, in the condition in which the driving stability of the vehicle is secured, the execution of the regenerative braking is maximized, and in the condition in which the driving stability of the vehicle should be further secured, the execution of the regenerative braking is not performed or is optimized, primarily securing the driving stability and, simultaneously, achieving improvement of fuel efficiency.

An example of a control process of the present invention will be described below with reference to FIG. 2.

Figure 2:
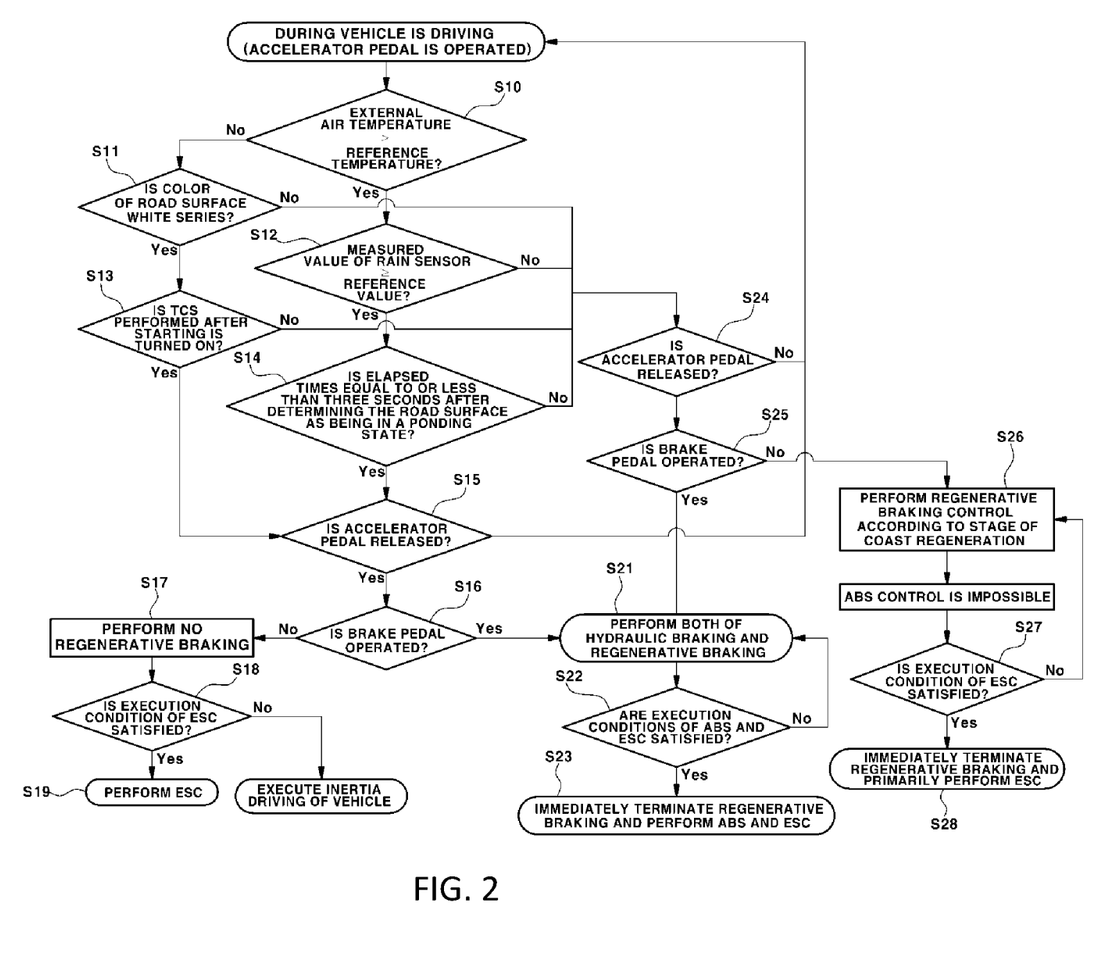
FIG. 2 is a flowchart illustrating an example of the regenerative braking control method of a vehicle according to an exemplary embodiment of the present invention.

As shown in FIG. 2, while the vehicle is driving in a state in which the accelerator pedal is being operated, a detected vehicle external air temperature is compared with a predetermined reference temperature (S10).

When the detected vehicle external air temperature is less than the predetermined reference temperature, whether a color of the road surface detected by the vision sensor 2 is white series is determined (S11). When the road surface is a snowy or icy road surface and the color of the road surface is determined as being white series, a driving risk of the road surface may be determined as being high. When the vehicle external air temperature is equal to or higher than the predetermined reference temperature, a measured rainwater value detected by the rain sensor 3 is compared with a predetermined rainwater reference value (S12). When the road surface is wet by rainwater to the extent of being slippery, a driving risk increases relative to a relatively less wet road surface (i.e., a dried road surface). Accordingly, when the measured rainwater value is equal to or greater than the predetermined rainwater reference value, the driving risk of the road surface may be determined as being high.

When the color of the road surface is determined as being white series in Operation S11, after a starting of the vehicle is turned on whether TCS control is executed is determined (S13). After a starting of the vehicle is turned on, whether the TCS control is executed (i.e., whether the TCS is operated) is monitored in real time, and the number of operation times and an operating time of the TCS are cumulatively determined. When the number of operation times of the TCS is equal to or greater than a predetermined number of predetermined times and the operating time of the TCS is equal to or greater than a predetermined time, the vehicle may be determined as being driving on a low friction road surface, such as a snowy or icy road surface, with a high driving risk. That is, in Operation S13, the driving risk of the road surface determined in Operation S11 may be re-determined and verified. Owing to the nature of the TCS control, execution probability of the TCS control on a high friction road is extremely low.

When the driving risk of the road surface is determined as being high in Operation S12, whether standing water exists on the road surface is determined and then whether the accelerator pedal is released within a predetermined time are determined (S14 and S15). When whether the accelerator pedal is released is determined within the predetermined time after the road surface is determined as being in a ponding state, i.e., immediately after the road surface is determined as being in a ponding state, the accelerator pedal may be determined as being released while the vehicle is driving on the road surface which is in the ponding state. Furthermore, whether the road surface is in the ponding state is determined in Operation S14 such that the driving risk of the road surface determined in Operation S12 may be re-determined and verified.

Even after the driving risk of the road surface is determined in Operation S13, whether the accelerator pedal is released is determined (S15). When the accelerator pedal is determined as being released in Operation S15, whether the brake pedal is operated is determined (S16).

When the brake pedal is determined as not being operated in Operation S16, driving stability of the road surface is determined as being difficult to be secured and the regenerative braking is not performed (S17).

Next, whether an execution condition of the ESC is satisfied is determined (S18), and when the execution condition of the ESC is determined as being satisfied, the ESC is executed (S19). Otherwise, when the execution condition of the ESC is determined as not being satisfied, the vehicle is driving in an inertial driving mode (S20).

When the brake pedal is determined as being operated in Operation S16, the driving risk of the road surface is high but a braking intent of the driver exists such that regenerative braking cooperative control, in which both of the hydraulic braking and the regenerative braking are performed, is executed (S21).

While the regenerative braking cooperative control is executed, whether execution conditions of the ABS and the ESC are satisfied is determined (S22). When any one of the execution conditions of the ABS and the ESC is determined as being satisfied in Operation S22, the regenerative braking cooperative control is immediately terminated, and the ABS and/or the ESC satisfying one of the execution conditions is primarily executed (S23).

Meanwhile, when the driving risk of the road surface is determined as not being high in Operations S11, S12, S13, and S14, the regenerative braking may be controlled according to determination results of Operations S24 and S25 in which whether the accelerator pedal is released and whether the brake pedal is operated are determined. When the accelerator pedal is determined as being released in Operation S24 and the brake pedal is determined as being operated in Operation S25, the regenerative braking may be controlled according to Operations S21, S22, and S23.

Furthermore, when the accelerator pedal is determined as being released in Operation S24 and the brake pedal is determined as not being operated in Operation S25, the regenerative braking is performed according to a stage of the coasting regeneration which is set by the driver (S26). In the instant case, only the regenerative braking is performed without performing the hydraulic braking, and the braking intent of the driver does not exist such that the execution condition of the ABS control is not determined.

While the regenerative braking is performed in Operation S26, whether the execution condition of the ESC is satisfied is determined (S27). When the execution condition of the ESC is determined as being satisfied, the regenerative braking is immediately terminated and the ESC is primarily performed (S28).

In accordance with the regenerative braking control method of a vehicle according to an exemplary embodiment of the present invention, in the condition in which the driving stability of the vehicle is secured, the execution of the regenerative braking is maximized, and in the condition in which the driving stability of the vehicle should be further secured, the execution of the regenerative braking is not performed or is optimized such that the driving stability may be primarily secured and, simultaneously, improvement of fuel efficiency may be achieved.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A regenerative braking control method of a vehicle, the regenerative braking control method comprising:
    a first operation of determining, by a control unit, a driving risk of a road surface on a basis of a status of the road surface while driving;
    a second operation of determining, by the control unit, when an accelerator pedal is released while driving;
    a third operation of determining, by the control unit, when a brake pedal is operated while driving; and
    a fourth operation of performing neither friction braking nor regenerative braking by the control unit configured for concluding so as not to generate control signal for performing the regenerative braking in a state in which the accelerator pedal is released and at the same time the brake pedal is determined as not being operated when the controller concludes that the driving risk of the road surface is determined as being high, so that a lock phenomenon is prevented from occurring at a front wheel driveshaft and at a rear wheel driveshaft, thereby preventing an understeer phenomenon and an oversteer phenomenon,
    wherein the first operation includes a color detecting operation of determining the driving risk of the vehicle driving on the road surface on a basis of a measured value of a vision sensor of the vehicle which detects a color of the road surface,
    wherein when a detected color of the road surface is a same as a predetermined color, the driving risk of the road surface is determined as being high, and
    wherein the first operation further includes:
        determining a number of operation times of a traction control system (TCS) for preventing wheel slip and an operating time of the TCS after the color detecting operation and then after a starting of the vehicle is turned on; and
        re-determining the driving risk of the road surface as being high, when the number of operation times of the TCS is equal to or greater than a number of predetermined times for which an occurrence rate of the wheel slip is determined as being high and accumulation of the operating time of the TCS is equal to or greater than a predetermined time for which the occurrence rate of the wheel slip is determined as being high.

2. The regenerative braking control method of claim 1, wherein the color detecting operation further includes determining the driving risk of the road surface as being high, when the accelerator pedal is determined as being released, the driving risk of the road surface is determined as being high, and when the brake pedal is determined as not being operated.

3. The regenerative braking control method of claim 1, wherein the color detecting operation further includes determining the driving risk of the road surface as not being high, when the accelerator pedal is determined as being released, the driving risk of the road surface is determined as being high, and when the brake pedal is determined as not being operated.

4. The regenerative braking control method of claim 1, wherein the first operation further includes a rain detecting operation of determining the driving risk of the vehicle driving on the road surface on a basis of a measured value of a rain sensor of the vehicle which detects rainwater.

5. The regenerative braking control method of claim 4, wherein the rain detecting operation includes determining the driving risk of the road surface as being high, when the measured value of the rain sensor is equal to or greater than a reference value for determining the road surface as being wet.

6. The regenerative braking control method of claim 5, wherein the rain detecting operation further includes determining the driving risk of the road surface as not being high, when the measured value of the rain sensor is less than the reference value for determining the road surface as being wet.

7. The regenerative braking control method of claim 4, wherein the first operation further includes determining the driving risk of the road surface as being high, when the measured value of the rain sensor is equal to or greater than a reference value for determining the road surface as being wet.

8. The regenerative braking control method of claim 4, wherein the first operation further includes:
    determining the road surface as being in a ponding state, when a difference in wheel speed between a front left wheel speed and a front right wheel speed occurs after the rain detecting operation; and
    re-determining the driving risk of the road surface as being high, when the road surface is determined as being in the ponding state and then the accelerator pedal is determined as being released within a predetermined time after the vehicle is determined as driving on the road surface which is in the ponding state.

9. The regenerative braking control method of claim 4, wherein the first operation further includes determining that the driving risk of the road surface is determined by the color detecting operation, when an external air temperature of the vehicle is less than a reference temperature which is set to a temperature at which icing occurs on the road surface.

10. The regenerative braking control method of claim 9, wherein the first operation further includes determining that the driving risk of the road surface is determined as being high by the rain detecting operation, when the external air temperature of the vehicle is equal to or higher than the reference temperature.

11. The regenerative braking control method of claim 1, further including:
a fifth operation of generating a braking force of the vehicle by performing only the regenerative braking among hydraulic braking and the regenerative braking, when the driving risk of the road surface is determined as not being high in the first operation, the accelerator pedal is determined as being released, and when the brake pedal is determined as not being operated.

12. The regenerative braking control method of claim 11, wherein when an execution condition of electronic stability control (ESC) is determined as being satisfied, the regenerative braking is terminated and the ESC is performed.

13. The regenerative braking control method of claim 1, further including:
a sixth operation of generating a braking force of the vehicle by performing the regenerative braking and hydraulic braking, when the driving risk of the road surface is determined as not being high in the first operation, the accelerator pedal is determined as being released, and when the brake pedal is determined as being operated.

14. The regenerative braking control method of claim 1, further including:
a seventh operation of generating a braking force of the vehicle by performing the regenerative braking and hydraulic braking, when the driving risk of the road surface is determined as being high in the first operation, the accelerator pedal is determined as being released, and when the brake pedal is determined as being operated.

15. The regenerative braking control method of claim 14, wherein when one of execution conditions of anti-lock brake system (ABS) and the ESC is determined as being satisfied, the ABS or the ESC satisfying the one of the execution conditions is executed.

16. The regenerative braking control method of claim 1, further including:
an eighth operation of determining when an execution condition of electronic stability control (ESC) for steering a driving direction of the vehicle is satisfied after the fourth operation;
a ninth operation of executing the ESC, when the execution condition of the ESC is determined as being satisfied; and
a tenth operation of allowing the vehicle to drive in an inertial driving mode in which the accelerator pedal is released, when the execution condition of the ESC is determined as not being satisfied.

* * * * *